(12) United States Patent  
Mabuchi (10) Patent No.: US 8,432,494 B2  
(45) Date of Patent: Apr. 30, 2013

(54) VIDEO SIGNAL OUTPUT CIRCUIT

(75) Inventor: Shigeki Mabuchi, Tama (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 13/304,961

(22) Filed: Nov. 28, 2011

(65) Prior Publication Data

US 2012/0133838 A1 May 31, 2012

(30) Foreign Application Priority Data

Nov. 29, 2010 (JP) ................................. 2010-264464

(51) Int. Cl.
*H04N 5/16* (2006.01)
*H04N 5/18* (2006.01)

(52) U.S. Cl.
USPC ............................ 348/691; 348/689; 348/707

(58) Field of Classification Search .................. 348/691, 348/689, 695, 707; 330/250, 252, 256, 261, 330/296, 127; *H04N 5/18, 5/16, 5/14*
See application file for complete search history.

(56) References Cited

U.S. PATENT DOCUMENTS

| | | | | |
|---|---|---|---|---|
| 4,973,890 A | * | 11/1990 | Desjardins | 330/296 |
| 5,126,831 A | * | 6/1992 | Nakagawara | 348/695 |
| 6,891,574 B1 | * | 5/2005 | Page | 348/584 |

FOREIGN PATENT DOCUMENTS

| | | |
|---|---|---|
| JP | 62-186674 A | 8/1987 |
| JP | 07-183810 A | 7/1995 |

* cited by examiner

*Primary Examiner* — Sherrie Hsia
(74) *Attorney, Agent, or Firm* — Holtz, Holtz, Goodman & Chick, P.C.

(57) ABSTRACT

Disclosed is a video signal output circuit including: a clamp circuit; a first differential amplifying circuit; a dividing circuit; and an offset circuit which adds or subtracts a predetermined offset voltage to or from a bias voltage, a reference voltage, or a base reference voltage generated by the dividing circuit so as to supply an offset voltage added/subtracted voltage to the clamp circuit or the first differential amplifying circuit, wherein the offset circuit includes a pnp bipolar transistor and an npn bipolar transistor, and outputs a difference voltage corresponding to a difference between a base-emitter voltage of the pnp bipolar transistor and a base-emitter voltage of the npn bipolar transistor.

5 Claims, 8 Drawing Sheets

PRIOR ART

VIDEO SIGNAL OUTPUT CIRCUIT

BACKGROUND OF THE INVENTION

1. Field of the Invention

The present invention relates to a video signal output circuit which amplifies and outputs video signals, and, in particular, relates to a technology which is effective when applied to a single power video driver which does not require an output coupling capacitor.

2. Description of the Related Art

An electronic apparatus such as a digital still camera or a DVD player is provided with a terminal to output video signals to an external display apparatus such as a liquid crystal display panel. As a device (IC) to output video signals to the terminal, a video driver is known. In recent years, in order to minimize an apparatus, a single power video driver which does not require an output coupling capacitor is practically used. According to the JEITA (Japan Electronics and Information Technology industry Association) standard, with respect to video signals outputted from a video apparatus, it is stipulated that a DC (Direct Current) voltage for when there is no signal is ±100 mV (75Ω, terminated). Hence, in a single power video driver, it is necessary to keep the DC voltage of an output terminal for when there is no signal within a range of 0 mV to 200 mV.

Figure 8:
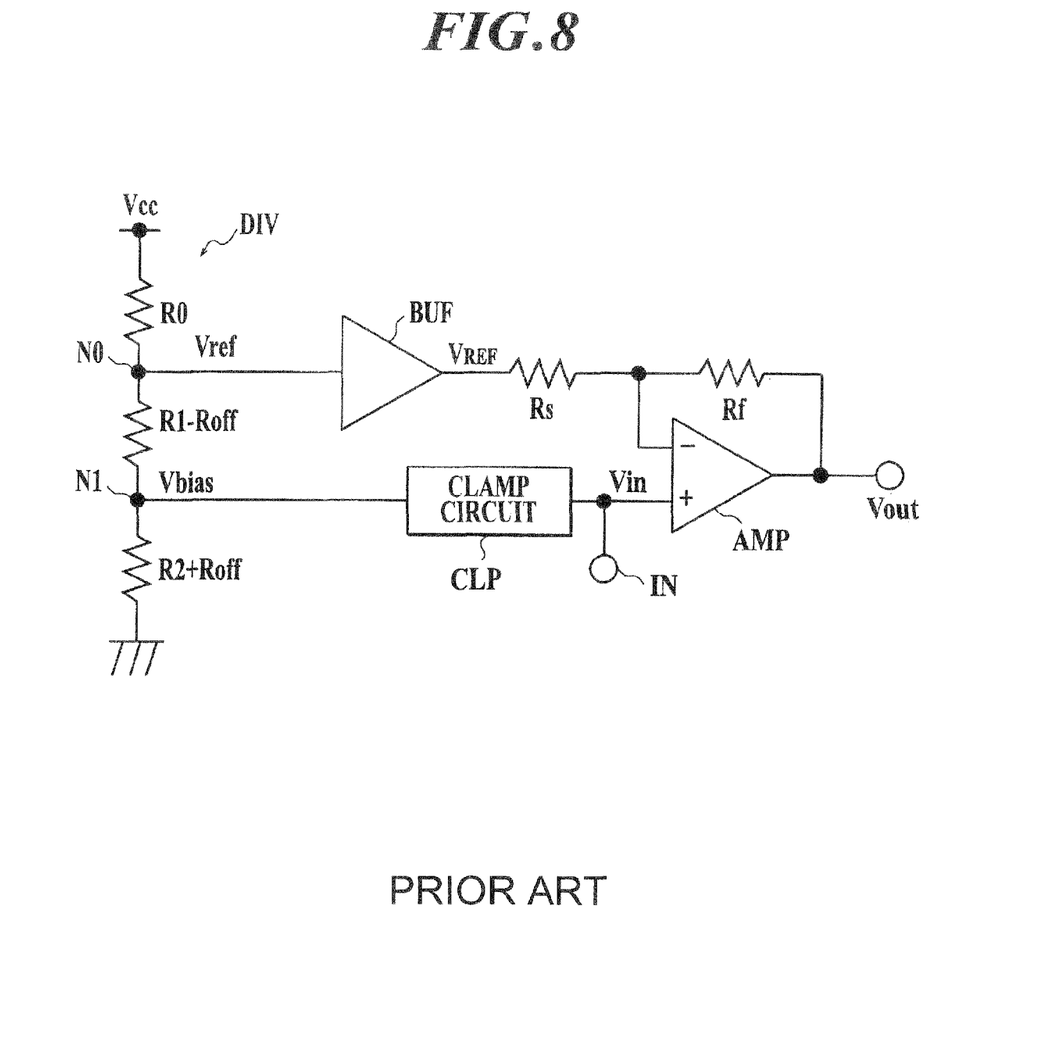
FIG. 8 is a circuit diagram showing an example of a conventional video driver.

As a video driver which meets the condition described above, the present inventor et al. have developed, as shown in FIG. 8, a video driver including: a non-inverting amplifier AMP which amplifies video signals inputted from an input terminal IN within a predetermined range of amplitude; a clamp circuit CLP which makes the sync tip levels of horizontal synchronizing signals included in the video signals uniform; a resistance voltage dividing circuit DIV which generates a reference voltage Vref determining an operating point of the amplifier AMP, and also generates a bias voltage Vbias for the clamp circuit CLP; a buffer BUF for impedance conversion; and a low-pass filter (not shown). There is conventionally known a method of, in a video signal output circuit, fixing video signals at a predetermined electric potential by using a clamp circuit. Examples of the method are disclosed by, for example, Japanese Patent Application Laid-Open Publication No. sho 62-186674 and Japanese Patent Application Laid-Open Publication No. hei 7-183810.

As shown in FIG. 8, the resistance voltage dividing circuit DIV includes a resistor R1 and a resistor R2. The video driver shown in FIG. 8 can keep the DV voltage for when there is no signal within a range of ±100 mV centering 100 mV by setting a resistance value of the resistor R1 and a resistance value of the resistor R2 to R1−Roff and R2+Roff, respectively, so as to shift the bias voltage Vbias for a desired offset voltage (in this case, 100 mV which is the center of the range of 0 mV to 200 mV). The bias voltage Vbias is obtained by the resistance ratio of the resistor R1 to the resistor R2. The resistance value of the resistor R1 is set to R1−Roff in order to shift only the bias voltage Vbias, and not to shift the reference voltage Vref.

In the video driver shown in FIG. 8, the gain of the amplifier AMP is determined by the resistance ratio of a resistor Rs to a resistor Rf. However, by setting the resistance values of the resistors R1, R2, Rs, and Rf so as to be R1:R2=Rs:Rf, even when the resistance values of the resistors Rs and Rf shift from their respective desired resistance values because of manufacturing variations, the resistance ratio of the resistor Rs to the resistor Rf scarcely shifts. Furthermore, by setting the resistance values of the resistors R1, R2, Rs, and Rf so as to be R1:R2=Rs:Rf, when the resistance ratio of the resistor R1 to the resistor R2 shifts, the resistance ratio of the resistor Rs to the resistor Rf also shifts. Accordingly, the output DC level can be prevented from shifting, which occurs because of the manufacturing variations.

SUMMARY OF THE INVENTION

However, in the video driver shown in FIG. 8, when a power supply voltage Vcc changes or when ambient temperature changes and a parameter of an element of the video driver changes accordingly, the output DC level cannot avoid from shifting. Furthermore, the circuit, namely, the video driver, shown in FIG. 8 is vulnerable to the change of the power supply voltage Vcc, and hence, as a product, the video driver has a narrow operating power supply voltage range, and also has a poor power supply ripple rejection characteristic. In a DVD player provided with not only a video signal output terminal but also an audio signal output terminal, a voltage of 12V is used as a power supply voltage of an audio driver which outputs audio signals, the voltage which is higher than a power supply voltage of a video driver, the voltage which is, for example, 3.3V or 5V. Consequently, in such a DVD player, there is a case that the power supply voltage greatly changes when such drivers are switched. Therefore, it cannot be said that it is preferable to apply the circuit having a poor power supply ripple rejection characteristic shown in FIG. 8 to such a video apparatus.

The present invention is made in view of the circumstances. An object of the present invention is to provide a video signal output circuit which can prevent the output DC level from shifting not only when there are manufacturing variations but also when the power supply voltage changes, and/or the ambient temperature changes, and which has a wide operating power supply voltage range and an excellent power supply ripple rejection characteristic.

In order to achieve at least one object described above, according to an aspect of the present invention, there is provided a video signal output circuit including: a clamp circuit which clamps an electric potential of an input terminal into which a video signal is inputted; a first differential amplifying circuit into which the video signal inputted from the input terminal and a predetermined reference voltage are inputted, and which amplifies and outputs the inputted video signal; a dividing circuit which generates a bias voltage supplied to the clamp circuit, and generates the reference voltage supplied to the first differential amplifying circuit or a base reference voltage of the reference voltage; and an offset circuit which adds or subtracts a predetermined offset voltage to or from the bias voltage, the reference voltage, or the base reference voltage generated by the dividing circuit so as to supply an offset voltage added/subtracted voltage to the clamp circuit or the first differential amplifying circuit, wherein the offset circuit includes a pnp bipolar transistor and an npn bipolar transistor, and outputs a difference voltage corresponding to a difference between a base-emitter voltage of the pnp bipolar transistor and a base-emitter voltage of the npn bipolar transistor.

BRIEF DESCRIPTION OF THE DRAWINGS

The present invention is fully understood from the detailed description given hereinbelow and the accompanying drawings, which are given by way of illustration only, and thus are not intended as limits of the present invention, wherein:

FIGS. 7A to 7D are circuit diagrams each showing a resistance voltage dividing circuit of the video driver of the embodiment, according to a third modification of the present invention.

DESCRIPTION OF THE PREFERRED EMBODIMENT

In the following, an embodiment and modifications of the present invention are described in detail with reference to the accompanying drawings. However, the present invention is not limited to the embodiment and modifications illustrated by the drawings.

Embodiment

In the following, an embodiment of the present invention is described with reference to the accompanying drawings.

Figure 1:
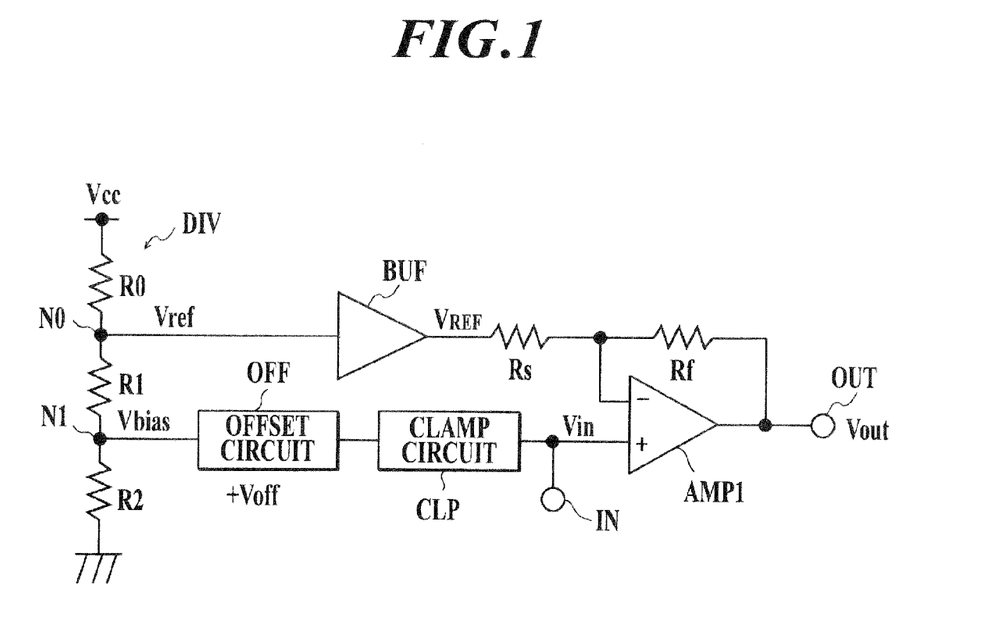
FIG. 1 is a circuit diagram showing a configuration of a video driver as a video signal output circuit according to an embodiment of the present invention.

FIG. 1 shows a video driver according to an embodiment of the present invention. Although not particularly limited, elements constituting a circuit shown in FIG. 1 are formed on one semiconductor chip, and configured as a semiconductor integrated circuit (IC).

As shown in FIG. 1, the video driver of the embodiment includes: a non-inverting amplifier AMP1; a clamp circuit CLP; a resistance voltage dividing circuit DIV; a buffer BUF; and an offset circuit OFF. The non-inverting amplifier AMP1 amplifies video signals inputted from an input terminal IN within a predetermined range of amplitude. The clamp circuit CLP makes sync tip levels of horizontal synchronizing signals included in the video signals uniform. The resistance voltage dividing circuit DIV generates a reference voltage Vref (a base reference voltage of the reference voltage Vref) supplied to the amplifier AMP1, and also generates a bias voltage Vbias supplied to the clamp circuit CLP. The buffer BUF is composed of a voltage follower or the like, and performs impedance conversion on the reference voltage Vref which is generated by the resistance voltage dividing circuit DIV, and supplies the reference voltage Vref on which the impedance conversion is performed to the non-inverting amplifier AMP1. The offset circuit OFF adds an offset voltage Voff to the bias voltage Vbias which is generated by the resistance voltage dividing circuit DIV, and supplies the offset voltage Voff-added bias voltage Vbias to the clamp circuit CLP.

The resistance voltage dividing circuit DIV is composed of resistors R0, R1, and R1 which are connected between a power supply voltage terminal VCC and a ground in series. The resistance ratio thereof is set in such a way that the reference voltage Vref is generated at a connection node N0 of the resistor R0 and the resistor R1, and the bias voltage Vbias is generated at a connection node N1 of the resistor R1 and the resistor R2. The reference voltage Vref gives the non-inverting amplifier AMP1 a level which serves as a reference for amplifying a video signal when the video signal is inputted into the input terminal IN. The bias voltage Vbias gives the clamp circuit CLP a bias for clamping the sync tip level at the input terminal IN at a predetermined electric potential.

By adding the offset circuit OFF to the video driver shown in FIG. 8, the video driver according to the embodiment of the present invention can easily make the DV voltage at an output terminal OUT, the DV voltage for when there is no signal, 100 mV which is the center of the range of 0 mV to 200 mV, without shifting the resistance values of the resistor R1 and R2 of the resistance voltage dividing circuit DIV. Furthermore, power supply voltage dependence can be reduced by setting the resistance values. Although not being shown, a low-pass filter which removes sampling noise of a DAC (Digital-Analog Convertor) or the like may be provided before the input terminal IN, namely, upper than the input terminal IN in a current flowing direction, or between the input terminal IN and the output terminal OUT.

Functions of the offset circuit OFF of the video driver shown in FIG. 1 and characteristics required for the offset circuit OFF thereof are described. When attention is paid to the resistance voltage dividing circuit DIV in FIG. 1, the electric potential Rref at the connection node N0 of the resistor R0 and the resistor R1 is expressed by the following formula 1, and the electric potential Vbias at the connection node N1 of the resistor R1 and the resistor R2 is expressed by the following formula 2.

$$Vref = \frac{R1 + R2}{R0 + R1 + R2} \cdot VCC \quad \text{[Formula 1]}$$

$$Vbias = \frac{R2}{R0 + R1 + R2} \cdot VCC \quad \text{[Formula 2]}$$

Furthermore, an output voltage Vclamp of the clamp circuit CLP is expressed by Vclamp=Vbias+Voff, namely, an input voltage Vin is expressed by the following formula 3. An input voltage VREF of the non-inverting amplifier AMP1 is expressed by VREF=Vref. Therefore, when Av represents the gain of the non-inverting amplifier AMP1, an output voltage Vout of the video driver is expressed by the following formula 4.

$$Vin = Vbias + Voff \quad \text{[Formula 3]}$$

$$Vout = VREF + Av(Vin - VREF) \quad \text{[Formula 4]}$$

The gain Av is expressed by the following formula 5. When the formulas 1 to 4 are assigned to the formula 5, the formula 5 is transformed to the formula 6 shown below the formula 5.

$$Av = \frac{Rs + Rf}{Rs} \quad \text{[Formula 5]}$$

$$Vout = \left( \frac{R1 + R2}{R0 + R1 + R2} + \frac{Rs + Rf}{Rs} \cdot \frac{R2}{R0 + R1 + R2} - \frac{Rs + Rf}{Rs} \cdot \frac{R1 + R2}{R0 + R1 + R2} \right) VCC + \frac{Rs + Rf}{Rs} \cdot Voff \quad \text{[Formula 6]}$$

According to the formula 6, in order not to make the output voltage Vout of the video driver have the power supply voltage dependence, it is needed that the first term of the formula 6 is 0, namely, the following formula 7 is true.

$$\left(\frac{R1+R2}{R0+R1+R2} + \frac{Rs+Rf}{Rs} \cdot \frac{R2}{R0+R1+R2} - \frac{Rs+Rf}{Rs} \cdot \frac{R1+R2}{R0+R1+R2}\right) = 0 \quad \text{[Formula 7]}$$

When simplified, the formula 6 becomes the following formula 8.

$$Vout = \left(\frac{Rs \cdot R2 - Rf \cdot R1}{Rs(R0+R1+R2)}\right)VCC + \frac{Rs+Rf}{Rs} \cdot Voff \quad \text{[Formula 8]}$$

According to the formula 8, in order to eliminate the term with Vcc, it is needed that Rs·R2−Rf·R1=0 is true, namely, R1:R2=Rs:Rf is true. When the resistance values of the resistors R1, R2, Rs, and Rf are determined to meet this condition, the formula 6 becomes the following formula 9.

$$Vout = \frac{Rs+Rf}{Rs} \cdot Voff \quad \text{[Formula 9]}$$

From the formula 9, it can be known that when the offset voltage Voff which is added by the offset circuit OFF does not have the power supply voltage dependence and the temperature dependence, the output voltage Vout of the video driver dose not have the power supply voltage dependence and the temperature dependence, either. In order to make the DC voltage for when there is no video signal, namely, the output voltage Vout of the video driver, 100 mV which is the center of the range of 0 mV to 200 mV, the offset voltage Voff needs to be set to 50 mV when the amplification degree of the non-inverting amplifier AMP1 is "2" (gain=6 dB).

Figure 2:
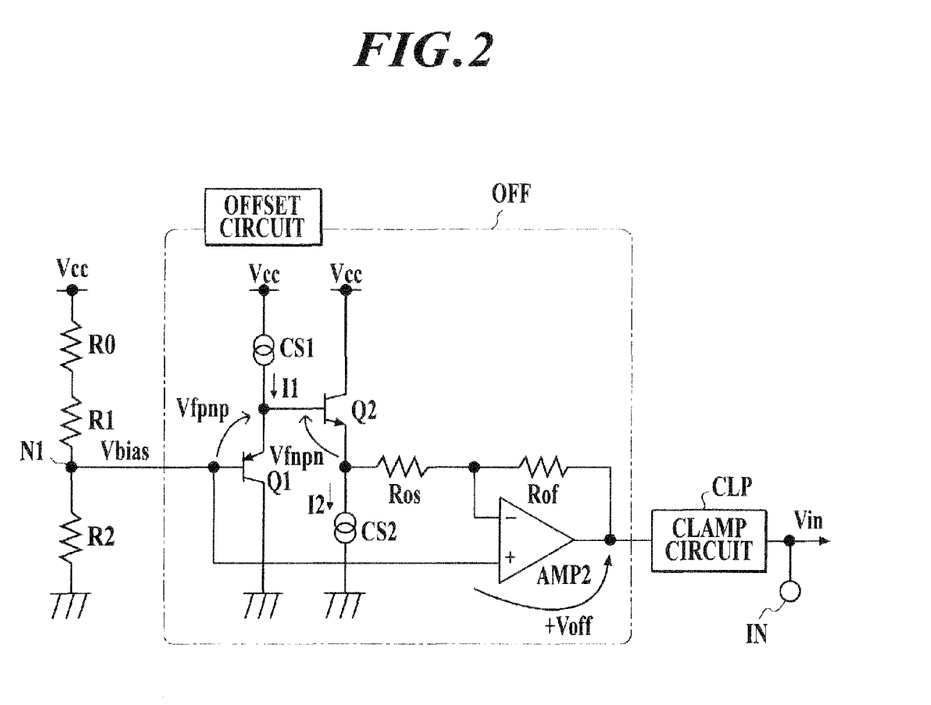
FIG. 2 is a circuit diagram showing an offset circuit of the video driver according to the embodiment.

FIG. 2 shows a specific example of the offset circuit OFF. The offset circuit OFF of the embodiment includes: a constant current source CS1; a common-collector pnp bipolar transistor Q1; a constant current source CS2; a common-collector npn bipolar transistor Q2; and an inverting amplifier AMP2. The constant current source CS1 and the pnp bipolar transistor Q1 are connected between a power supply voltage terminal VCC and a ground in series. The constant current source CS2 and the npn bipolar transistor Q2 are connected between a power supply voltage terminal VCC and a ground in series. The inverting amplifier AMP2 includes an input resistor Ros and a feedback resistor Rof.

The base terminal of the pnp bipolar transistor Q1 is connected to the connection node N1 of the resistor R1 and the resistor R2 of the resistance voltage dividing circuit DIV. The base terminal of the npn bipolar transistor Q2 is connected to the emitter terminal of the pnp bipolar transistor Q1. The constant current source CS1 and the pnp bipolar transistor Q1 constitute an emitter follower, and the constant current source CS2 and the npn bipolar transistor Q2 constitute an emitter follower, too. An inverting input terminal of the inverting amplifier AMP2 is connected to the emitter terminal of the npn bipolar transistor Q2 via the input resistor Ros. The electric potential Vbias at the connection node N1 of the resistor R1 and the resistor R2 of the resistance voltage dividing circuit DIV is applied to a non-inverting input terminal of the inverting amplifier AMP2.

In general semiconductor processing, diffusion layers used as the emitter and base regions of an npn bipolar transistor and the emitter and base regions of a pnp bipolar transistor are formed at different steps, and hence impurity concentrations thereof are different from each other. Accordingly, there is a difference between a base-emitter voltage Vfnpn (corresponding to a forward voltage of the pn junction) of the npn bipolar transistor, and a base-emitter voltage Vfpnp of the pnp bipolar transistor. The offset circuit OFF of the embodiment uses the difference between the base-emitter voltage Vfnpn and the base-emitter voltage Vfpnp so as to generate the offset voltage Voff. Furthermore, because the difference between the base-emitter voltage Vfnpn and the base-emitter voltage Vfpnp is relatively small, the inverting amplifier AMP2 is provided to make the offset voltage Voff (the difference) a desired value (50 mV).

When Av2 represents the gain of the inverting amplifier AMP2, Ros represents the resistance value of the input resistor Ros, and Rof represents the resistance value of the feedback resistor Rof, Av2=(Ros+Rof)/Ros. Hence, the offset voltage Voff generated by the offset circuit OFF shown in FIG. 2 is expressed by the following formula 10.

$$Voff = -\frac{Ros+Rof}{Ros} \cdot (Vfpnp - Vfnpn) \quad \text{[Formula 10]}$$

Figure 3:
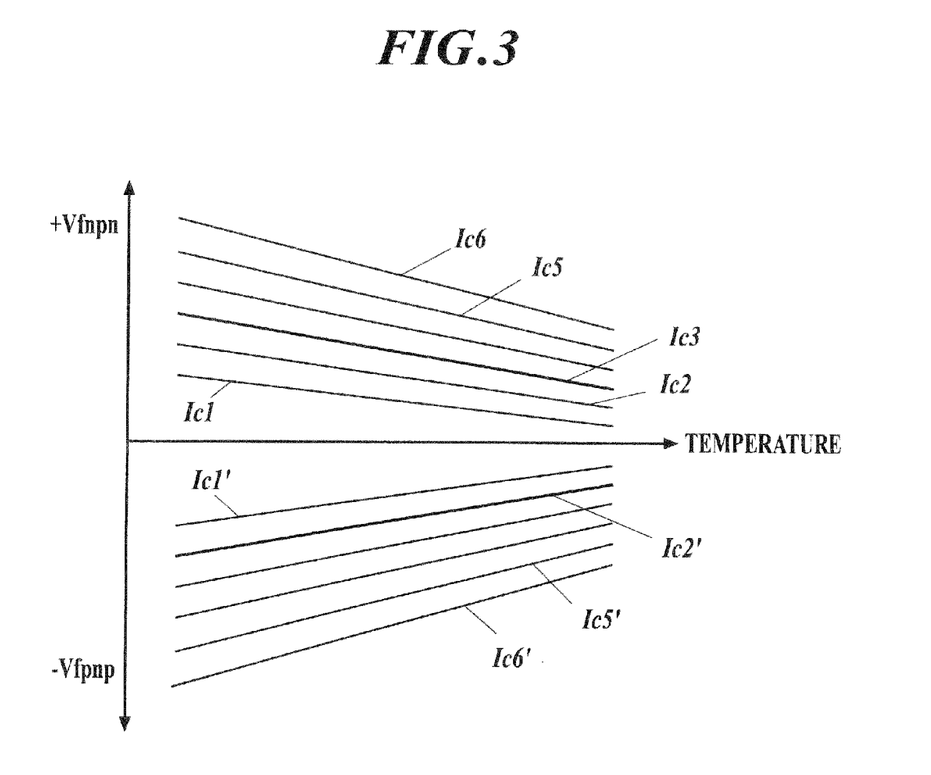
FIG. 3 is a graph showing temperature characteristics of a base-emitter voltage Vfnpn of an npn bipolar transistor and a base-emitter voltage Vfpnp of a pnp bipolar transistor of the offset circuit.

From the formula 10, it can be known that the offset voltage Voff does not have the power supply voltage dependence. Furthermore, the base-emitter voltage Vfpnp and the base-emitter voltage Vfnpn change depending on collector currents which flow in and from the pnp bipolar transistors Q1 and the npn bipolar transistor Q2, respectively. In addition, the base-emitter voltage Vfpnp and the base-emitter voltage Vfnpn have different temperature characteristics as shown in FIG. 3. Hence, a current I1 which flows in and from the constant current source CS1 and a current I2 which flows in and from the constant current source CS2 are set in such a way that the temperature characteristic of the base-emitter voltage Vfnpn and the temperature characteristic of the base-emitter voltage Vfpnp are offset so that the value of (Vfpnp−Vfnpn) does not have the temperature characteristic. Accordingly, the offset voltage Voff can be made not to have the temperature dependence.

More specifically, when, for example, a base-emitter voltage Vfnpn having a temperature characteristic of −2 mV/° C. (collector current=Ic3) is selected from a plurality of base-emitter voltages Vfnpn having different temperature characteristics, a base-emitter voltage Vfpnp having a temperature characteristic of −2 mV/° C. (collector current=Ic2') is selected from a plurality of base-emitter voltages Vfpnp having different temperature characteristics. Then, the collector current Ic3 and the collector current Ic2' are respectively set as current values of the CS1 and the CS2 shown in FIG. 2, and a circuit is designed in such a way that the constant currents flow. By designing a circuit in such a way, the offset voltage Voff added by the offset circuit OFF can be made not to have the temperature dependence.

The video driver of the embodiment is the same as the conventional circuit shown in FIG. 8 in the configurations of the resistance voltage dividing circuit DIV and the non-inverting amplifier AMP1. Accordingly, like the conventional circuit, the video driver of the embodiment is not easily influenced by the manufacturing variations. Furthermore, by setting the current values of the constant current sources CS1 and CS2 as described above, the video driver of the embodiment can be made not to have the temperature dependence. Consequently, the video driver of the embodiment can stably operate against the change of the ambient temperature within a wide range thereof. Furthermore, because, as described above, the power supply voltage dependence is low, the video driver of the embodiment has a wide operating power supply voltage range and an excellent power supply ripple rejection characteristic. The clamp circuit CLP may be a circuit having one transistor shown in FIG. 4A, or may be a differential circuit shown in FIG. 4B, to be more specific.

Figure 4A:
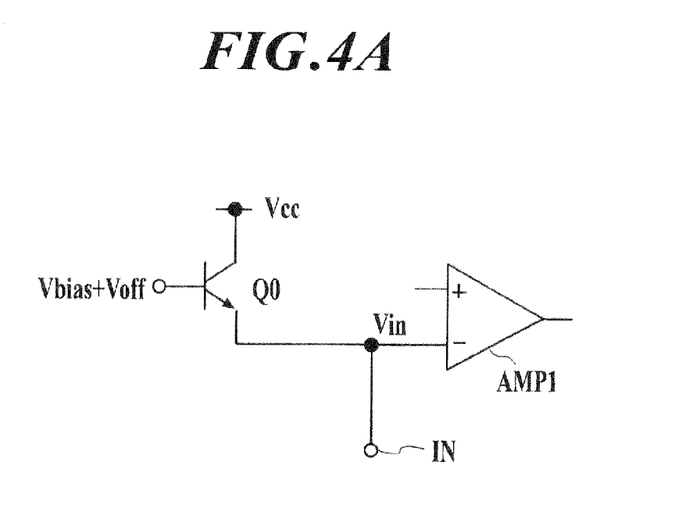
FIGS. 4A and 4b are circuit diagrams each showing a clamp circuit of the video driver according to the embodiment.
Figure 4B:
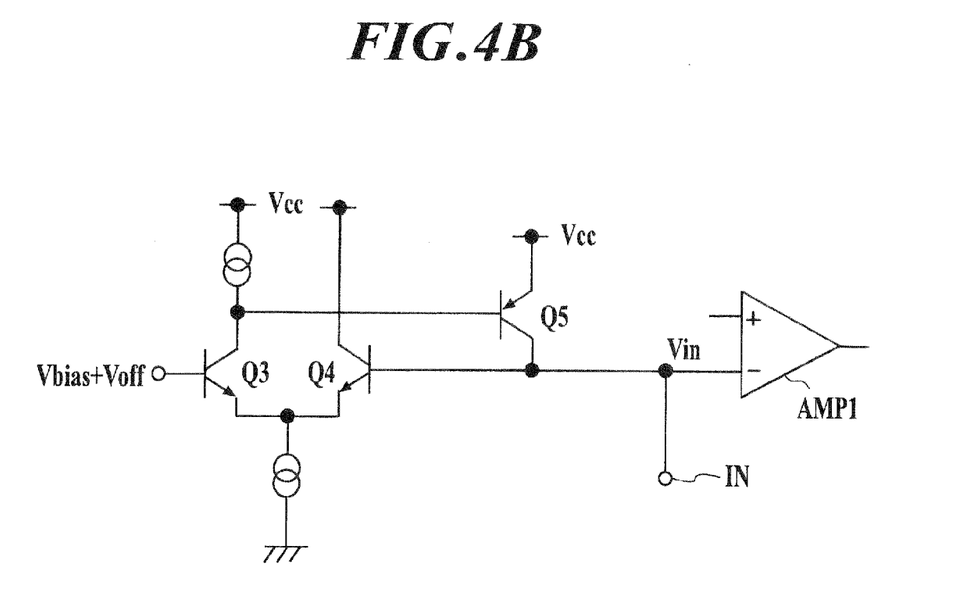

In a case of a transistor Q0 of the clamp circuit CLP shown in FIG. 4A or a transistor Q5 of the clamp circuit CLP shown in FIG. 4B, when a significant signal is inputted into the input terminal IN, the electric potential at the input terminal IN becomes high, whereby the transistor Q0 shown in FIG. 4A or the transistor Q5 shown in FIG. 4B goes into an off state, and the clamp circuit CLP goes into an output high impedance state. When a horizontal synchronizing pulse (signal) of a video signal is inputted, the transistor Q0 or the transistor Q5 is turned on, and the clamp circuit CLP clamps the electric potential at the input terminal IN at the sync tip level. That is, the clamp circuit CLP shown in FIG. 4A or FIG. 4B performs a clamp operation only during the horizontal synchronizing pulse (signal) input. The clamp circuit CLP is not limited to the circuits shown in FIGS. 4A and 4B.

[First Modification]

Figure 5:
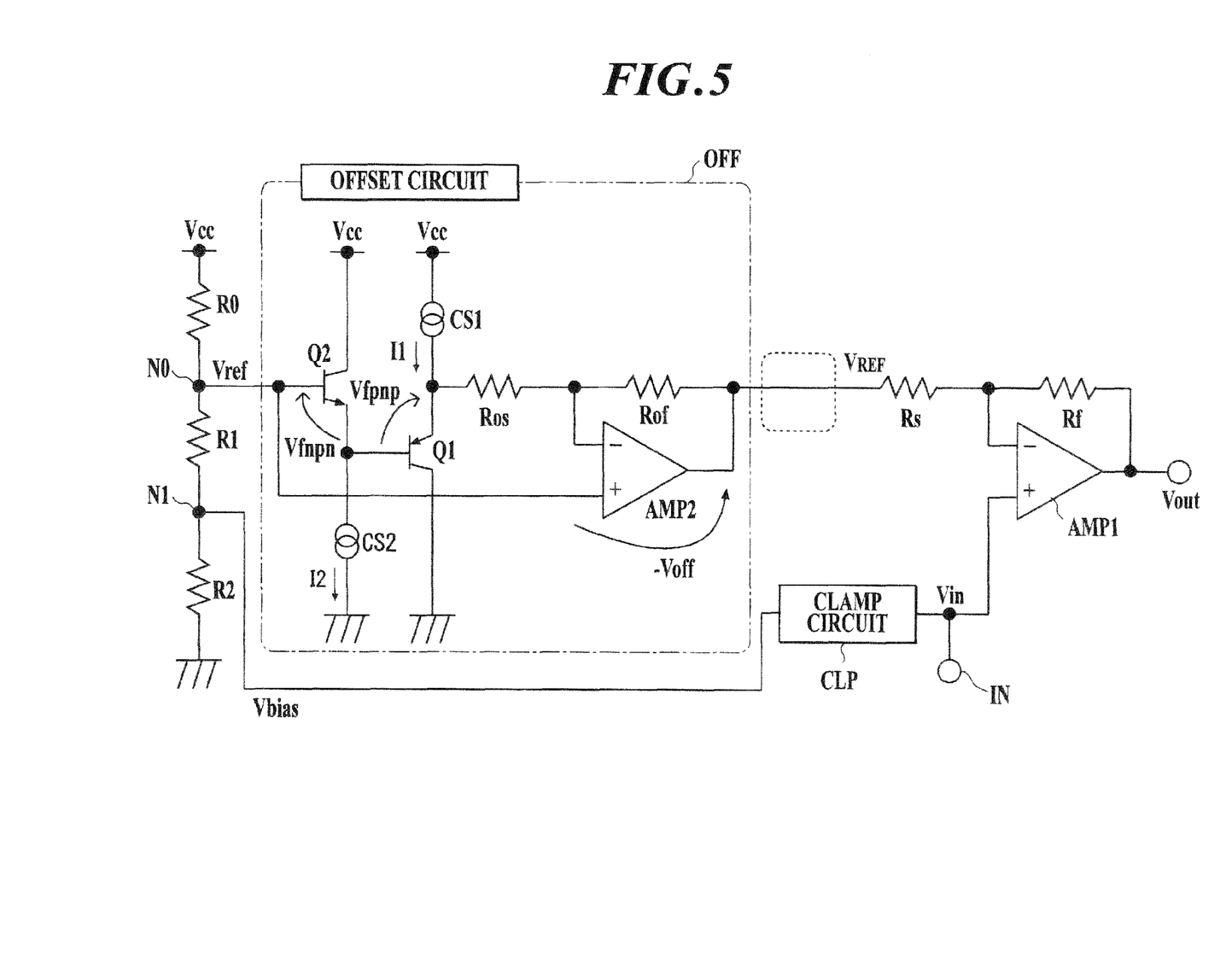
FIG. 5 is a circuit diagram showing a configuration of a video driver according to a first modification of the present invention, the video driver being modified from the video driver of the embodiment.

FIG. 5 shows a configuration of a video driver according to a first modification of the present invention, the video driver which is modified from the video driver of the embodiment. In the first modification, the offset circuit OFF is disposed not before the clamp circuit CLP but at an inverting input terminal side of the non-inverting amplifier AMP1. The inverting input terminal thereof is a terminal to which the reference voltage Vref is applied. In addition, in the first modification, a negative offset voltage −Voff is added to the reference voltage Vref (in other words, a positive offset voltage Voff is subtracted from the reference voltage Vref) by the offset circuit OFF. In order to generate the negative offset voltage −Voff, in the offset circuit OFF shown in FIG. 5, a difference between the base-emitter voltage Vfpnp of the pnp bipolar transistor Q1 and the base-emitter voltage Vfnpn of the npn bipolar transistor Q2 is opposite to the difference therebetween shown in FIG. 2. The video driver of the first modification can obtain the same advantageous effects as the video driver of the embodiment can obtain, as compared with the conventional circuit.

Furthermore, in the first modification, the positions of the pnp bipolar transistor Q1 and the position of the npn bipolar transistor Q2 are changed from the positions thereof shown in FIG. 2, so that the emitter follower of the npn bipolar transistor Q2 is disposed before the emitter follower of the pnp bipolar transistor Q1. Accordingly, even when the power supply voltage Vcc becomes low, the operating voltage of the constant current source CS1 can be obtained for sure. Furthermore, in the video driver shown in FIG. 5, the function of the buffer BUF shown in FIG. 1 can be performed by the inverting amplifier AMP2 of the offset circuit OFF. Accordingly, the buffer BUF is not included in the video driver of the first modification. The inverting amplifier AMP2 can be replaced by a non-inverting amplifier.

[Second Modification]

Figure 6A:
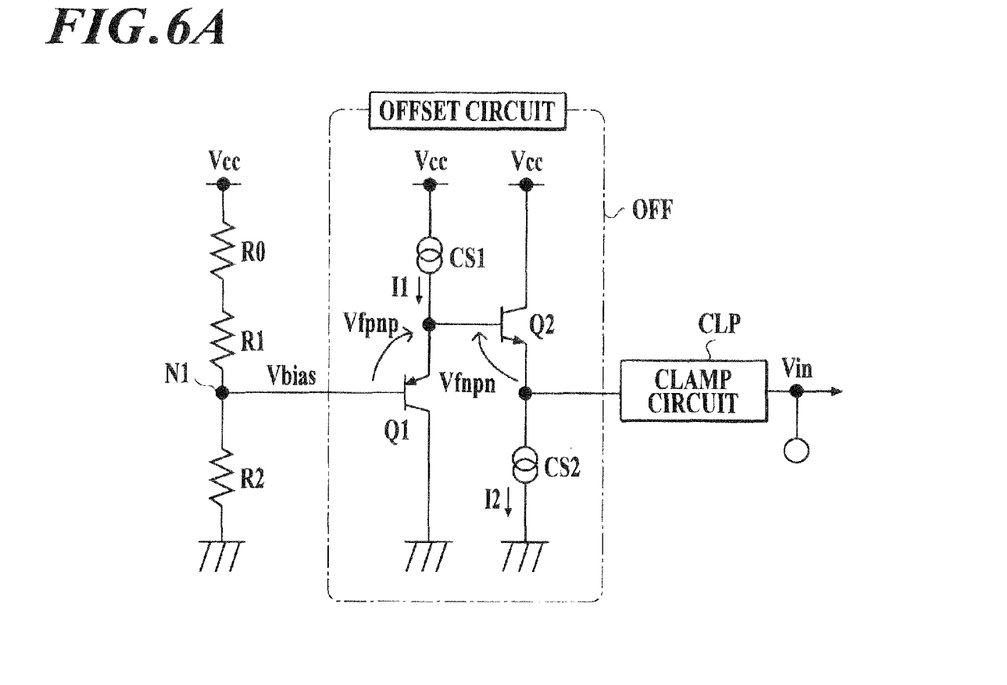
FIGS. 6A and 6B are circuit diagrams each showing an offset circuit of the video driver of the embodiment, according to a second modification of the present invention.
Figure 6B:
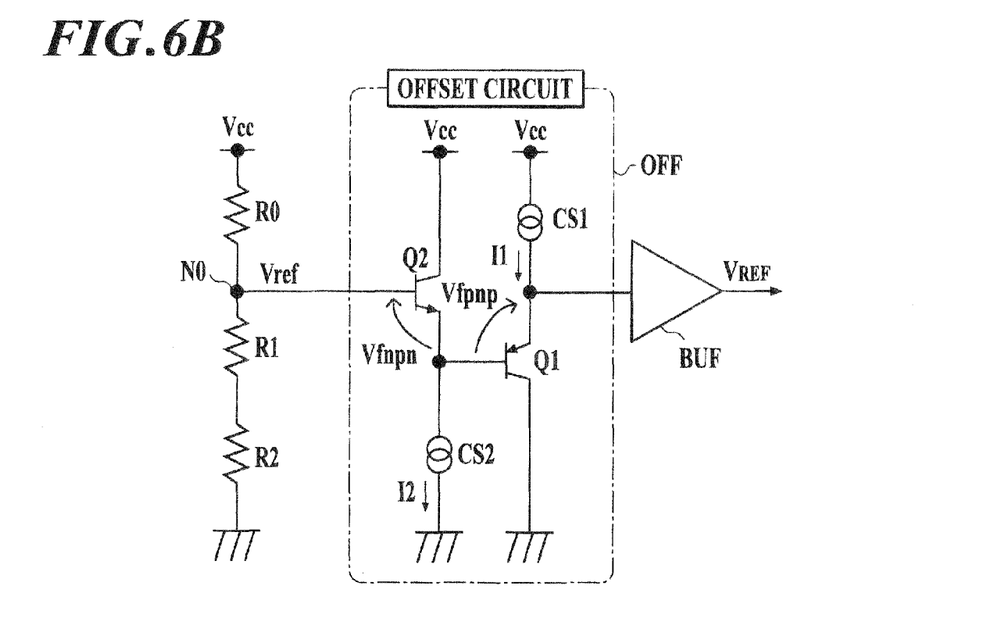

Each of FIGS. 6A and 6B shows an offset circuit OFF of the video driver of the embodiment, according to a second modification of the present invention. According to the second modification, in a case where the difference (Vfpnp−Vfnpn) between the base-emitter voltage Vfpnp of the pnp bipolar transistor Q1 and the base-emitter voltage Vfnpn of the npn bipolar transistor Q2 is a desired offset voltage Voff without being amplified, the inverting amplifier AMP2 shown in FIG. 2 or FIG. 5 is not included in the video driver of the second modification. Accordingly, the number of amplifiers can be reduced by one, and hence the chip size can be reduced. Furthermore, because one amplifier can be removed, the influence of an input offset voltage which the removed amplifier would have can be eliminated accordingly, and hence the manufacturing variations of the output DC voltage can be made less.

The concentrations of the diffusion layers which form the base and emitter regions of the pnp bipolar transistor and the npn bipolar transistor may be proactively adjusted so as to make the difference (Vfpnp−Vfnpn) between the base-emitter voltage Vfpnp and the base-emitter voltage Vfnpn a desired offset voltage Voff, so that the video driver of the second modification can be used. According to the offset circuit OFF shown in FIG. 6B which is modified from the offset circuit OFF of the video driver shown in FIG. 5, a buffer BUF is required, the buffer which is disposed after the offset circuit OFF, namely, lower than the offset circuit OFF in the current flowing direction. This is because the inverting amplifier AMP2 is not included in the video driver. Hence, the advantageous effect that the chip size can be reduced cannot be obtained in this case. However, the manufacturing variations of the output DC voltage can be made less.

[Third Modification]

Figure 7A:
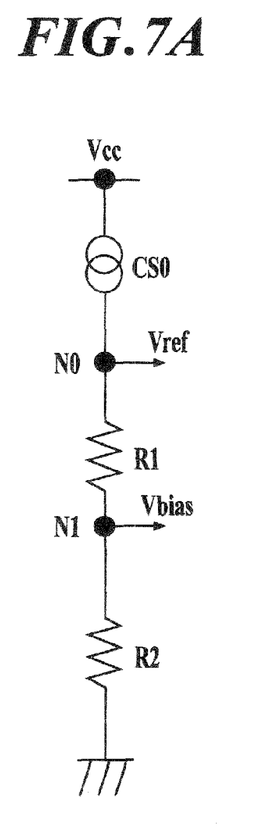
Figure 7B:
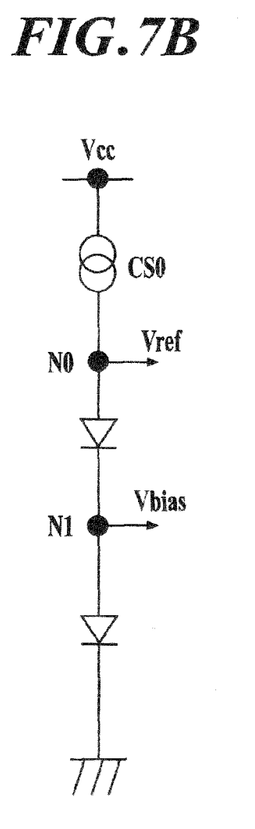
Figure 7C:
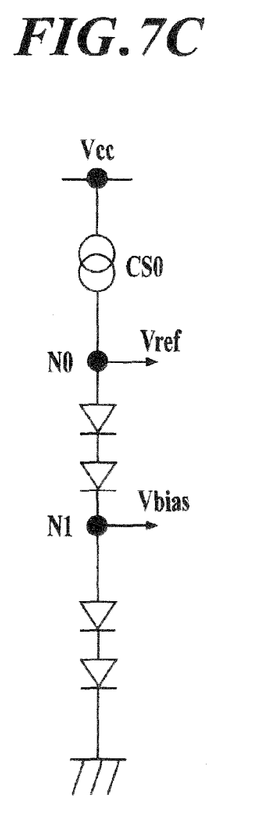
Figure 7D:
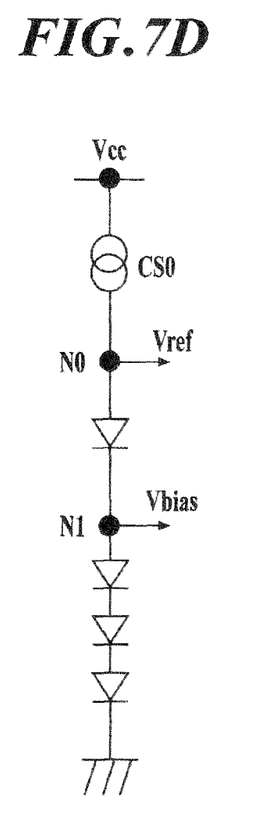

Each of FIGS. 7A to 7D shows a resistance voltage dividing circuit DIV of the video driver of the embodiment, according to a third modification of the present invention. FIG. 7A shows the resistance voltage dividing circuit DIV in which the resistor R0 is replaced by a constant current source CS0, and each of FIGS. 7B to 7D shows the resistance voltage dividing circuit DIV in which the resistor R0 is replaced by the constant current source CS0, and also the resistors R1 and R2 are replaced by diodes.

In order to set the gain of the non-inverting amplifier AMP1, which is a final stage amplifier, to 6 dB (two times), the ratio of the number of diodes between the node N0 and the node N1 to the number of diodes between the node N1 and the ground is set to 1:1 as shown in FIGS. 7B and 7C. In order to set the gain of the non-inverting amplifier AMP1, which is a final stage amplifier, to 12 dB (four times), the ratio of the number of diodes between the node N0 and the node N1 to the number of diodes between the node N1 and the ground is set to 1:3 as shown in FIG. 7D.

In the above, the present invention is described in accordance with the embodiment and modifications in detail. However, the present invention is not limited to the embodiment and modifications, and hence can be variously and appropriately modified within a range of technical ideas of the present invention.

Furthermore, although, in the embodiment and modifications, the cases where the present invention is applied to a video driver are described, the present invention can be applied to a wide range of semiconductor integrated circuits each having an internal circuit to which a desired offset voltage is to be added.

According to an aspect of the embodiment of the present invention, there is provided a video signal output circuit including: a clamp circuit which clamps an electric potential of an input terminal into which a video signal is inputted; a first differential amplifying circuit into which the video signal inputted from the input terminal and a predetermined reference voltage are inputted, and which amplifies and outputs the inputted video signal; a dividing circuit which generates a bias voltage supplied to the clamp circuit, and generates the reference voltage supplied to the first differential amplifying circuit or a base reference voltage of the reference voltage; and an offset circuit which adds or subtracts a predetermined offset voltage to or from the bias voltage, the reference voltage, or the base reference voltage generated by the dividing circuit so as to supply an offset voltage added/subtracted voltage to the clamp circuit or the first differential amplifying circuit, wherein the offset circuit includes a pnp bipolar transistor and an npn bipolar transistor, and outputs a difference voltage corresponding to a difference between a base-emitter voltage of the pnp bipolar transistor and a base-emitter voltage of the npn bipolar transistor.

Accordingly, because the bias voltage or the reference voltage (the base reference voltage) to which the offset voltage is added or from which the offset voltage is subtracted by the offset circuit is supplied to the clamp circuit or the first differential amplifying circuit, by setting the resistance ratio of a resistor to another resistor of the dividing circuit which generates the bias voltage and the reference voltage (the base reference voltage) in such a way as to correspond to the resistance ratio of an input resistor to a feedback resistor of the first differential amplifying circuit which amplifies the video signal, the power supply voltage dependence of an output voltage can be reduced, and the power supply ripple rejection characteristic can be increased.

Preferably, in the video signal output circuit, the offset circuit includes a first constant current source connected with the pnp bipolar transistor in series, and a second constant current source connected with the npn bipolar transistor in series, and a current which the first constant current source supplies to the pnp bipolar transistor and a current which the second constant current source supplies to the npn bipolar transistor are set such that a temperature characteristic of the base-emitter voltage of the pnp bipolar transistor is almost equal to a temperature characteristic of the base-emitter voltage of the npn bipolar transistor.

Accordingly, the offset voltage generated by the offset circuit can be made not to have the temperature dependence, and hence the temperature dependence of the output voltage can be reduced.

Preferably, in the video signal output circuit, the offset circuit includes a second differential amplifying circuit into which the difference voltage is inputted, and into which the bias voltage or the base reference voltage inputted into the offset circuit is inputted, the difference voltage which corresponds to the difference between the base-emitter voltage of the pnp bipolar transistor and the base-emitter voltage of the npn bipolar transistor.

Accordingly, even when the difference between the base-emitter voltage of the pnp bipolar transistor and the base-emitter voltage of the npn bipolar transistor does not match a desired offset voltage, the desired offset voltage can be generated from the electric potential difference being amplified by the second differential amplifying circuit.

Preferably, in the video signal output circuit, the offset circuit is provided between the dividing circuit and the first differential amplifying circuit, the bias voltage generated by the dividing circuit is supplied to the clamp circuit, the base reference voltage generated by the dividing circuit is supplied to the offset circuit, and the offset voltage added/subtracted voltage is supplied to the first differential amplifying circuit.

Accordingly, the second differential amplifying circuit also works as a circuit which performs impedance conversion on the reference voltage supplied to the first differential amplifying circuit, and hence it becomes unnecessary to provide a buffer.

Preferably, in the video signal output circuit, the offset circuit is provided between the dividing circuit and the clamp circuit, and a buffer is provided between the dividing circuit and the first differential amplifying circuit, the buffer which performs impendence conversion on the reference voltage and transfers the reference voltage on which the impedance conversion is performed.

By providing the buffer which performs the impedance conversion on the reference voltage and transfers the reference voltage on which the impedance conversion is performed, even in the case where the offset circuit is provided between the dividing circuit and the clamp circuit, the reference voltage generated by the diving circuit can be prevented from shifting, and the power supply voltage dependence of the output voltage can be reduced.

According to the embodiment and modifications of the present invention, a video signal output circuit can be provided, the video signal output circuit which can prevent the output DC level from shifting not only when there are manufacturing variations, but also when the power supply voltage changes, and/or the ambient temperature changes. Furthermore, a video signal output circuit can be provided, the video signal output and an excellent power supply ripple rejection characteristic.

The present U.S. patent application claims priority to Japanese Patent Application No. 2010-264464 filed on Nov. 29, 2010 under the Paris Convention for the Protection of Industrial Property, and the Japanese Patent Application is a ground for correction of mistakes in translation of the present U.S. Patent Application when necessary.

What is claimed is:

1. A video signal output circuit comprising:
a clamp circuit which clamps an electric potential of an input terminal into which a video signal is inputted;
a first differential amplifying circuit into which the video signal inputted from the input terminal and a predetermined reference voltage are inputted, and which amplifies and outputs the inputted video signal;
a dividing circuit which generates a bias voltage supplied to the clamp circuit, and generates the reference voltage supplied to the first differential amplifying circuit or a base reference voltage of the reference voltage; and
an offset circuit which adds or subtracts a predetermined offset voltage to or from the bias voltage, the reference voltage, or the base reference voltage generated by the dividing circuit so as to supply an offset voltage added/subtracted voltage to the clamp circuit or the first differential amplifying circuit, wherein
the offset circuit includes a pnp bipolar transistor and an npn bipolar transistor, and outputs a difference voltage corresponding to a difference between a base-emitter voltage of the pnp bipolar transistor and a base-emitter voltage of the npn bipolar transistor.

2. The video signal output circuit according to claim 1, wherein
the offset circuit includes a first constant current source connected with the pnp bipolar transistor in series, and a second constant current source connected with the npn bipolar transistor in series, and
a current which the first constant current source supplies to the pnp bipolar transistor and a current which the second constant current source supplies to the npn bipolar transistor are set such that a temperature characteristic of the base-emitter voltage of the pnp bipolar transistor is almost equal to a temperature characteristic of the base-emitter voltage of the npn bipolar transistor.

3. The video signal output circuit according to claim 1, wherein the offset circuit includes a second differential amplifying circuit into which the difference voltage is inputted, and into which the bias voltage or the base reference voltage inputted into the offset circuit is inputted, the difference voltage which corresponds to the difference between the base-emitter voltage of the pnp bipolar transistor and the base-emitter voltage of the npn bipolar transistor.

4. The video signal output circuit according to claim 3, wherein
   the offset circuit is provided between the dividing circuit and the first differential amplifying circuit,
   the bias voltage generated by the dividing circuit is supplied to the clamp circuit,
   the base reference voltage generated by the dividing circuit is supplied to the offset circuit, and
   the offset voltage added/subtracted voltage is supplied to the first differential amplifying circuit.

5. The video signal output circuit according to claim 1, wherein
   the offset circuit is provided between the dividing circuit and the clamp circuit, and
   a buffer is provided between the dividing circuit and the first differential amplifying circuit, the buffer which performs impendence conversion on the reference voltage and transfers the reference voltage on which the impedance conversion is performed.

\* \* \* \* \*